(12) United States Patent
Katori et al.

(10) Patent No.: US 12,181,842 B2
(45) Date of Patent: Dec. 31, 2024

(54) RAMSEY SPECTROMETER, OPTICAL LATTICE CLOCK, AND RAMSEY SPECTROSCOPIC METHOD

(71) Applicants: Hidetoshi Katori, Wako (JP); Masao Takamoto, Wako (JP); SHIMADZU CORPORATION, Kyoto (JP)

(72) Inventors: Hidetoshi Katori, Itabashi-ku (JP); Masao Takamoto, Setagaya-ku (JP)

(73) Assignees: SHIMADZU CORPORATION, Kyoto (JP); Hidetoshi Katori, Wako (JP); Masao Takamoto, Wako (JP)

( * ) Notice: Subject to any disclaimer, the term of this patent is extended or adjusted under 35 U.S.C. 154(b) by 276 days.

(21) Appl. No.: 17/868,099

(22) Filed: Jul. 19, 2022

(65) Prior Publication Data

US 2023/0022012 A1  Jan. 26, 2023

(30) Foreign Application Priority Data

Jul. 21, 2021  (JP) .................................. 2021-120842

(51) Int. Cl.
*G04F 5/14* (2006.01)
*G01N 21/17* (2006.01)
*G01N 29/24* (2006.01)

(52) U.S. Cl.
CPC ......... *G04F 5/145* (2013.01); *G01N 21/1702* (2013.01); *G01N 29/2418* (2013.01)

(58) Field of Classification Search
CPC ....... G04F 5/145; G04F 5/14; G01N 29/2418; G01N 21/1702; G01N 21/39; G01N 21/85; G01N 21/31; G01N 21/3504; G01N 21/3581; G01N 21/636; G01N 21/65; G01N 2021/3595; G01J 3/44
See application file for complete search history.

(56) References Cited

U.S. PATENT DOCUMENTS

| 7,418,017 | B2 * | 8/2008 | Holzwarth | G01J 11/00 372/30 |
| 2010/0033256 | A1 * | 2/2010 | Strabley | G04F 5/14 331/3 |
| 2011/0080580 | A1 * | 4/2011 | Fermann | G01N 21/4795 372/18 |
| 2014/0347667 | A1 * | 11/2014 | Depenheuer | G01N 21/39 356/409 |

* cited by examiner

*Primary Examiner* — Suman K Nath
(74) *Attorney, Agent, or Firm* — Muir Patent Law, PLLC

(57) ABSTRACT

A Ramsey spectrometer is provided with an optical path, an optical path length stabilization circuit configured to stabilize a length of the optical path, a modulator optically connected to the optical path, the modulator being configured to generate resonant laser light of a first frequency f1 that causes a resonance of an atom, a molecule, or an ion as a spectroscopic target in pulses a plurality of times and generates non-resonant laser light of a second frequency f2 that does not cause the resonance, and a spectroscopic unit configured to spectroscope the spectroscopic target. The spectroscopic unit detects a state change of the spectroscopic target corresponding to the first frequency f1, the state change being caused by irradiating the resonant laser light to the spectroscopic target.

18 Claims, 9 Drawing Sheets

RAMSEY SPECTROMETER, OPTICAL LATTICE CLOCK, AND RAMSEY SPECTROSCOPIC METHOD

CROSS-REFERENCE TO RELATED APPLICATIONS

This application claims priority under 35 U.S.C. § 119 to Japanese Patent Application No. 2021-120842 filed on Jul. 21, 2021, the entire disclosure of which is incorporated herein by reference in its entirety.

BACKGROUND OF THE INVENTION

Field of the Invention

The present invention relates to a Ramsey spectrometer, an optical lattice clock equipped with a Ramsey spectrometer, and a Ramsey spectroscopic method.

Description of the Related Art

Devices utilizing a Ramsey resonance have been proposed (see, e.g., Non-Patent Documents 1 and 2)

PRIOR ART DOCUMENT

Patent Document 1: WO 2014/027637
Non-Patent Document 1: S. Falke, M. Misera, U. Sterr, C. Lisdat "Delivering pulsed and phase stable light to atoms of an optical clock," Appl Phys B (2012) 107, 301-311
Non-Patent Document 2: Filippo Bregolin "171Yb optical frequency standards towards the redefinition of the second," Doctoral Dissertation, Istituto Nazionale di Ricerca Metrologica (2019)

Hereinafter, a Ramsey spectrometer will be described. Ramsey spectroscopy utilizes a phenomenon known as a Ramsey resonance. In a Ramsey resonance, electromagnetic waves are irradiated a plurality of times (two times or more) in pulses against an atom at interval to cause interaction between the electromagnetic waves and the atom to thereby acquire a Ramsey resonance signal. As compared with Rabi spectroscopy not irradiating pulses a plurality of times, a Ramsey resonance signal is a sharpened signal, and therefore, it is possible to read the natural frequency of the atom with high resolution. This makes it possible to determine the natural frequency of the atom with high accuracy.

Here, it is critical that the pulses (Ramsey pulses) irradiated a plurality of times be phase-continuous. This means that the electromagnetic wave is interrupted once after the pulse irradiation, but the phase of the electromagnetic wave of the next pulse looks uninterrupted in the electromagnetic wave. If the phase of the Ramsey pulse is discontinuous, the reading deviates from the original natural frequency of the atom, resulting in a decrease in accuracy. Therefore, the Ramsey pulse is required to satisfy the phase continuity condition.

A single-wavelength laser light can be used as the electromagnetic wave used for a Ramsey pulse. At this time, it is affected by the Doppler effect caused by the change in the length of the optical path from the laser light source until it is irradiated to the atom, causing the fluctuation of the frequency (wavelength) of the laser light, which becomes a factor that deteriorates the spectral accuracy. In particular, in a configuration in which spectroscopic laser light is propagated to a spectroscopic unit through an optical path such as an optical fiber, the change in the length of the optical path is large, and therefore, the decrease in the spectral accuracy is remarkable.

As a technique for suppressing such a Doppler effect, there has been proposed a technique (optical path length stabilization technique) for detecting the frequency fluctuation of the laser light caused by the change in the optical path length and feeding back the fluctuation to remove the frequency fluctuation (see, for example, Non-Patent Document 1).

An optical path length stabilization technique needs to continuously emit laser light, and the stabilization also stops when the laser light is shut off. For this reason, there is a problem that the optical path length stabilization technique cannot be applied as it is to Ramsey spectroscopy which blocks light once.

In addition, it is also a problem to satisfy the Ramsey pulse phase continuity condition as described above when the optical path length stabilization technique is combined with the Ramsey spectroscopy.

SUMMARY OF THE INVENTION

The present invention has been made in view of the above-described problems. An objective of the present invention is to achieve Ramsey spectroscopy while effectively suppressing the Doppler effect.

In order to solve the above-described problem, a Ramsey spectrometer is provided with:
an optical path;
an optical path length stabilization circuit configured to stabilize a length of the optical path;
a modulator optically connected to the optical path, the modulator being configured to generate resonant laser light of a first frequency $f1$ that causes a resonance of an atom, a molecule, or an ion as a spectroscopic target in pulses a plurality of times and generates non-resonant laser light of a second frequency $f2$ that does not cause the resonance; and
a spectroscopic unit configured to spectroscope the spectroscopic target,
wherein the spectroscopic unit is configured to detect a state change of the spectroscopic target corresponding to the first frequency $f1$, the state being caused by irradiating the spectroscopic target with the resonant laser light.

In the above-described Ramsey spectrometer, it may be configured such that when n is an arbitrary natural number, an oscillation interval of the resonant laser light is T, and a time T1 and a time T2 are defined as time that satisfy $|f1-f2|=n/T1$, and $|f1-f2|=(n+1)/T2$, respectively, the oscillation interval T is set to satisfy $T1-0.25\cdot(T2-T1) \leq T \leq T1+0.25\cdot(T2-T1)$.

In the above-described Ramsey spectrometer, it may be configured such that the modulator generates the resonant laser light and the non-resonant laser light in such a manner that their phases are temporally continuous.

In the above-described Ramsey spectrometer, it may be configured such that the modulator includes a switching element that generates the resonant laser light and the non-resonant laser light by switching therebetween.

In the above-described Ramsey spectrometer, it may be configured such that a difference $|f1-f2|$ between the first frequency $f1$ and the second frequency $f2$ is set to satisfy $|f1-f2|=n/T$.

In the above-described Ramsey spectrometer, it may be configured such that the optical path includes an optical fiber.

In the above-described Ramsey spectrometer, it may be configured such that the optical path includes a free space.

In the above-described Ramsey spectrometer, it may be configured such that the modulator and the optical path length stabilization circuit are integral.

In the above-described Ramsey spectrometer, it may be configured such that the optical path length stabilization circuit is provided with a PC controlled oscillator, a voltage-controlled oscillator, and a multiplication circuit.

In the above-described Ramsey spectrometer, it may be configured such that the modulator and the optical path length stabilization circuit are independent.

In the above-described Ramsey spectrometer, it may be configured such that the optical path length stabilization circuit is provided with a PLL circuit.

In the above-described Ramsey spectrometer, it may be configured such that it further includes a laser light source connected to one end of the optical path.

In the above-described Ramsey spectrometer, it may be configured such that the Ramsey spectrometer further includes: a laser light modulator connected to the modulator, the laser light modulator being configured to modulate laser light emitted by the laser light source.

In the above-described Ramsey spectrometer, it may be configured such that the laser light modulator is an acousto-optic modulator.

Another aspect of the present invention is an optical lattice clock. This optical lattice clock is provided with the above-described Ramsey spectrometer.

Still another aspect of the present invention is a spectroscopic method. This method is a spectroscopic method using a Ramsey spectrometer.

The Ramsey spectrometer is provided with:
an optical path;
an optical path length stabilization circuit; and
a modulator optically connected to the optical path, and
a spectroscopic unit.

The spectroscopic method includes the steps of:
stabilizing a length of the optical path using the optical path length stabilization circuit;
generating resonant laser light of a first frequency f1 that causes a resonance of an atom, a molecule, or an ion as a spectroscopic target in pulses a plurality of times and generating non-resonant laser light of a second frequency f2 that does not cause the resonance; and spectroscopying the spectroscopic target using the spectroscopic unit.

In the above-described spectroscopic method, it may be configured such that when n is an arbitrary natural number, an oscillation interval of the resonant laser light is T, and a time T1 and a time T2 are defined as times that satisfy |f1−f2|=n/T1, and |f1−f2|=(n+1)/T2, respectively,
the oscillation interval T is set to satisfy $$T1-0.25\cdot(T2-T1) \leq T \leq T1+0.25\cdot(T2-T1).$$

In the above-described spectroscopic method, it may be configured such that a difference |f1−f2| between the first frequency f1 and the second frequency f2 is set to satisfy |f1−f2|=n/T.

It should be noted that any combination of the above-mentioned constituent elements and the expressions of the present invention converted between apparatuses, methods, systems, recording media, computer programs, and the like are also useful as an aspect of the present invention.

BRIEF DESCRIPTION OF THE DRAWINGS

The preferred embodiments of the present invention are shown by way of example, and not limitation, in the accompanying figures.

DETAILED DESCRIPTION OF EMBODIMENTS

Figure 1:
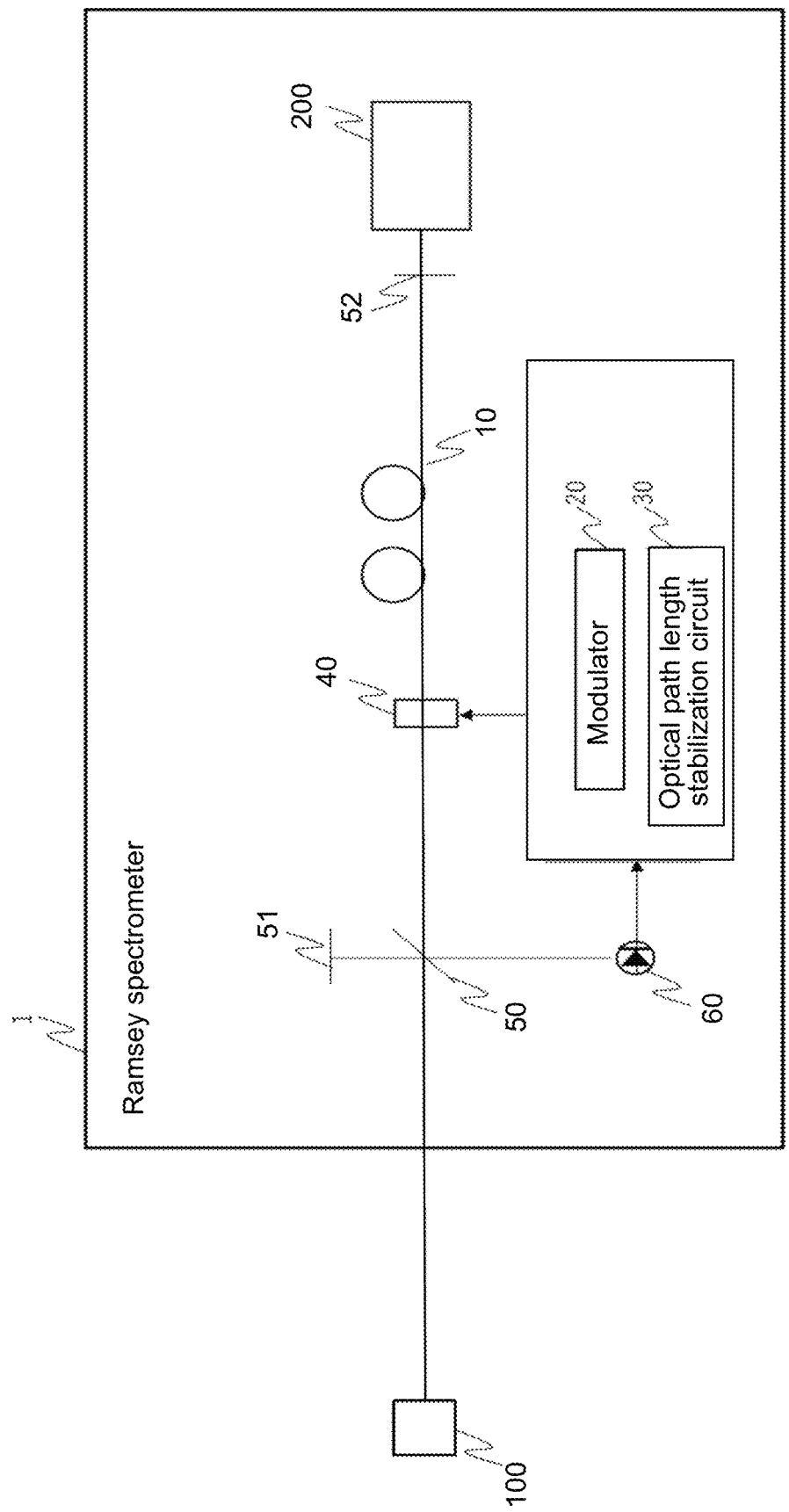
FIG. 1 is a functional block diagram of a Ramsey spectrometer according to a first embodiment.

The present invention will now be described by reference to the embodiments. This does not intend to limit the scope of the present invention, but to exemplify the invention.

Hereinafter, the present invention will be described with reference to the accompanying drawings based on preferred embodiments. Embodiments are illustrative rather than restrictive, and not necessarily all features or combinations of the features described in the Embodiments are essential to the present invention. The same or equivalent components, members, and processes shown in the respective drawings are assigned by the same reference numerals, and the duplicate descriptions will be omitted as appropriate. In addition, the scales and shapes of the respective parts shown in the respective drawings are set for convenience in order to facilitate the description and are not to be construed as limiting unless specifically mentioned. Also, when terms, such as, e.g., "first," "second," and the like, are used in this specification or in claims, the terms are not intended to represent any order or importance, unless otherwise noted, but are merely intended to distinguish one configuration from another. In the drawings, some members which are not essential for explaining embodiments are omitted.

First Embodiment

FIG. 1 is a functional block diagram of a Ramsey spectrometer 1 according to a first embodiment. The Ramsey spectrometer 1 is provided with an optical path 10, a modulator 20 optically connected to the optical path 10, an optical path length stabilization circuit 30 that stabilizes the length of the optical path 10, an acousto-optic modulator (hereinafter also referred to as "AOM" (Acousto Optic Modulator)) 40, and a spectroscopic unit 200 that spectroscopes an atom as a spectroscopic target. In the Ramsey spectrometer 1, a Michelson interferometer composed of a beam splitter 50, a reference mirror 51, and a lattice end mirror 52 is installed. An optical heterodyne detector 60 is provided in the front stage of the optical path length stabilization circuit 30. A laser light source 100 is connected to the left end of the optical path 10 when viewed towards the drawing, and a spectroscopic unit 200 is connected to the right end thereof. The modulator 20 and the optical path length stabilization circuit 30 are hardware-integrated.

The optical path 10 may be partially or entirely formed of an optical fiber or may be partially or entirely formed of a free space.

The modulator 20 generates resonant laser light of a first frequency f1 that causes a resonance of an atom in a plurality of times in pulses and generates non-resonant laser light of a second frequency f2 that does not cause a resonance. The difference between the first frequency f1 and the second frequency f2 is sufficiently large such that a Ramsey pulse does not excite the atom to be excited. The atom may be ytterbium, strontium or cadmium.

The modulator 20 may generate resonant laser light and non-resonant laser light so that the phases temporarily continue.

The modulator 20 may have a switching element that generates resonant laser light and non-resonant laser light by switching them.

The laser light source 100 may be provided with a plurality of laser diodes of, for example, an external resonator type.

The spectroscopic unit 200 detects the state change of the spectroscopic target corresponding to the frequency (first frequency f1) of the resonant laser light by irradiating the atom of the spectroscopic target with the resonant laser light arriving from the modulator 20.

As described in detail below, according to this embodiment, Ramsey spectroscopy can be realized while effectively suppressing the Doppler effect.

For example, when n is an arbitrary natural number and the oscillation interval of the Ramsey pulse is T, the difference |f1−f2| between the first frequency f1 and the second frequency f2 may satisfy the following equation.

$$|f1-f2|=n/T \quad (1)$$

Now the Ramsey resonance will be described. To solve the degeneracy of the level, a steady magnetic field is applied to align the atomic state to a certain level. In this state, the atom is irradiated with an electromagnetic pulse (called "Ramsey pulse") for a time τ. After that, it is irradiated with a Ramsey pulse for the time τ at the interval of the time T. When the atom and the electromagnetic wave are interacted in two steps in this way, the chance in which the atom transitions to other states depends not only on the time τ that actually interacts but also on the time interval T between the two interactions. This makes the generation of quantum transitions sensitive to frequency changes in the irradiated electromagnetic wave. This is called a Ramsey resonance. By utilizing this phenomenon, the center frequency of transitions can be measured with high accuracy. The observed resonance linewidth becomes narrower in proportion to time T. A spectrometer using a Ramsey resonance is called a Ramsey spectrometer.

Figure 2:
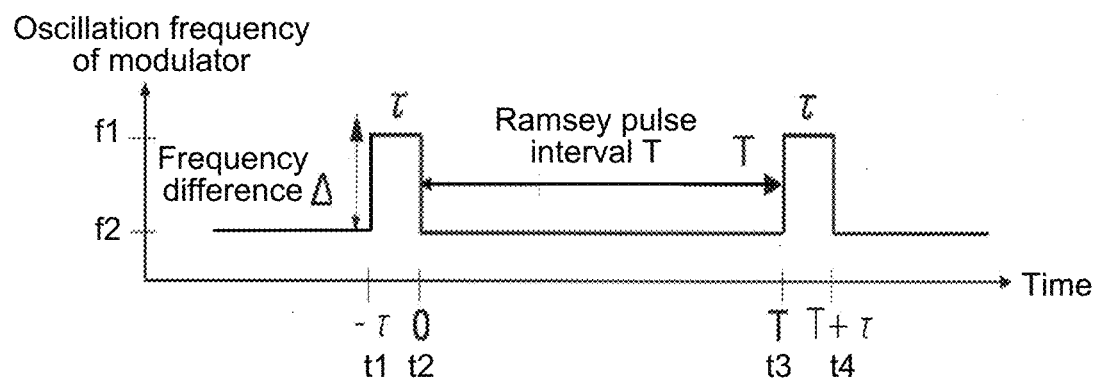
FIG. 2 is a graph showing a temporal change of an oscillation frequency of laser light of a Ramsey resonance according to the first embodiment.

FIG. 2 is a graph showing the temporal change of the oscillation frequency of the laser light of the Ramsey resonance according to this embodiment. Hereinafter, for time t, it is set such that t=−τ is t1, t=0 is t2, t=T is t3, and t=T+τ is t4. As shown, before the time −τ(t<t1), between time 0 and time T (t2<t<t3), after the time T+τ (t4<t), the modulator oscillates the electromagnetic wave of the second frequency f2. On the other hand, during time 0 from time −τ(t1≤t≤t2), during time T+τ from time T (t3≤t≤t4), the modulator oscillates the Ramsey pulse of the first frequency f1. In this example, f1=80 MHz and f2=79 MHz. Therefore, when the difference |f1−f2| between f1 and f2 is denoted as Δ, the difference is written as Δ=1 MHz.

Figure 3:
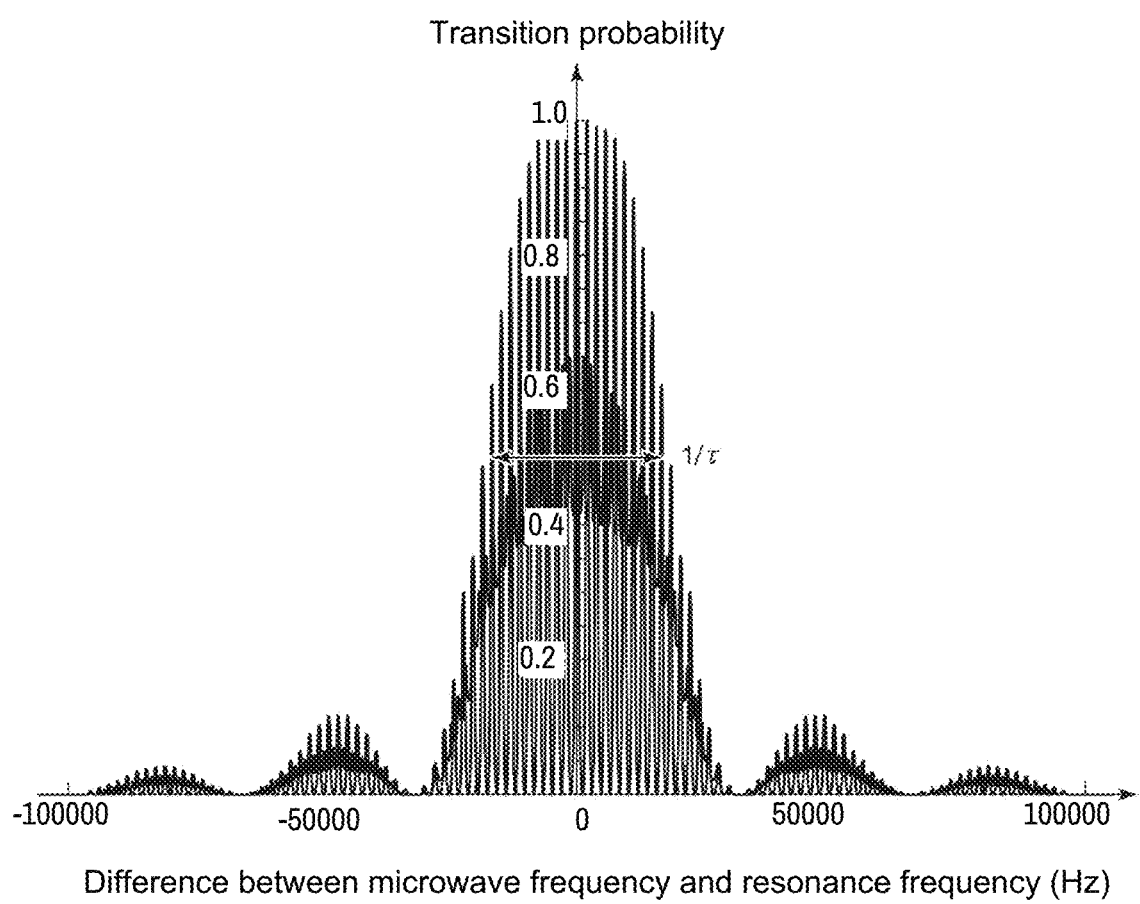
FIG. 3 is a Ramsey fringe according to the first embodiment.
Figure 4:
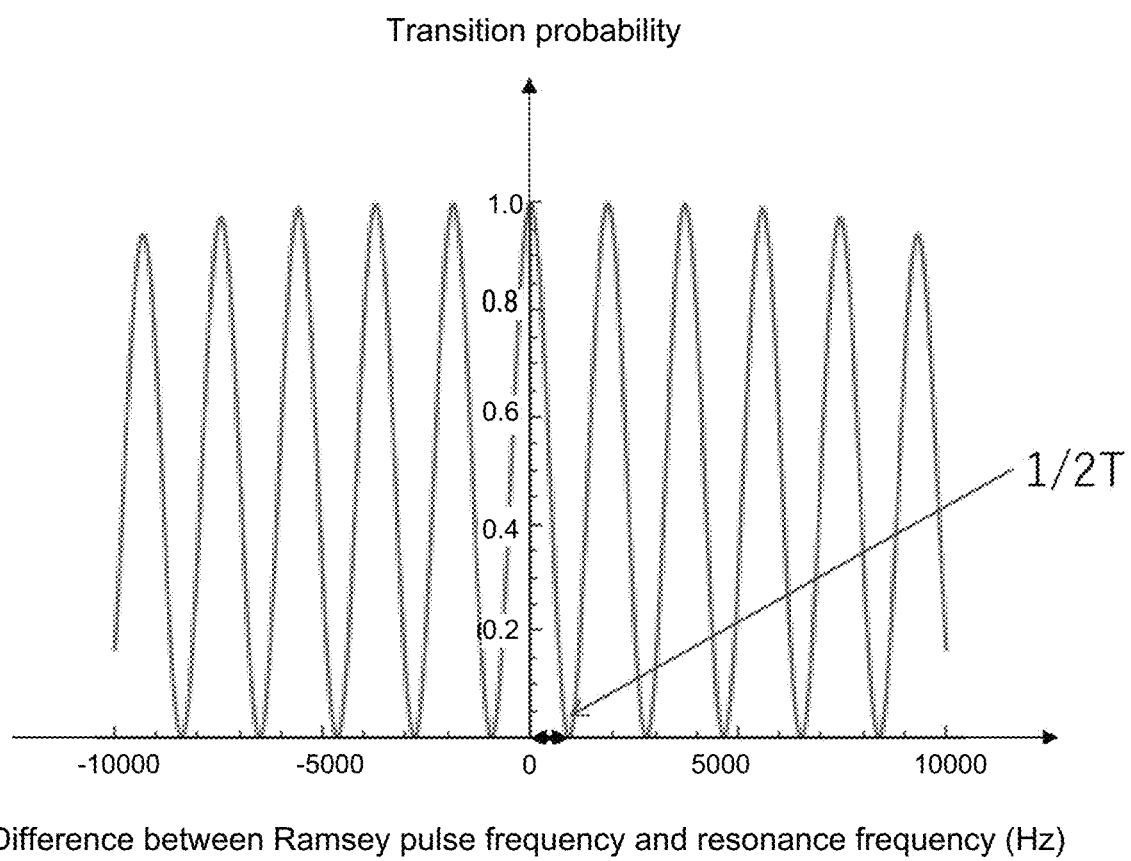
FIG. 4 is an enlarged view of FIG. 3 in the vicinity of the resonance frequency.

FIG. 3 shows the transition probability of the atom irradiated with electromagnetic waves oscillated as shown in FIG. 2 as a function of frequency detuning (difference between the optical frequency and the resonance frequency). This graph shows a fringe like an interference fringe and is called "Ramsey fringe." FIG. 4 is the enlarged view near the resonance frequency of FIG. 3. As shown, the Ramsey resonance allows the resonance frequency to be measured with a resolution on the order of 1/T. This indicates that the longer the interval T of the Ramsey pulse, the higher the measurement accuracy can be obtained. On the other hand, as shown in FIG. 3, the half width of the envelope curve of the Ramsey fringe is on the order of 1/T.

The second frequency f2 is preferably a frequency that does not excite the atom to which the Ramsey pulse excites, i.e., a non-resonance frequency.

The Ramsey pulse at the first time (t1≤t≤t2) and the Ramsey pulse at the second time (t3≤t≤t4) is phase coherent. Specifically, both the Ramsey pulses are taken from the same atomic resonance light reference. If both the Ramsey pulses are not phase coherent, the phase relation between them is random at [0, 2π]. Therefore, the interference fringe in the graph of FIG. 3 is blurred, and only the envelope curve is observed. In this case, the measurement accuracy of the resonance frequency drops from the order of 1/T to the order of 1/τ.

As mentioned above, the Ramsey resonance circuit turns on the switch of the first Ramsey pulse at t=t1 and turns off at t=t2. Then, it turns on the switch of the second Ramsey pulse at t=t3 and turns off at t=t4. By turning on and off this switch, the frequency switches between f1 and f2. In this case, the modulation for the Ramsey resonance is FSK. Note that the FSK modulation does not change the power inputted to the AOM-crystal, and therefore the crystal do not change in temperature and no chirp occurs in the frequency.

Generally, it is often referred to as a Ramsey resonance in a case where there is no irradiation of electromagnetic waves of the second frequency f2 during the period before the time −τ(t<−τ), between time 0 and time T (0<t<T), and after the time T+τ(T+τ<t), rather than being irradiated with electromagnetic waves during the period (in this case, the period of not being irradiated with electromagnetic waves is also referred to as "dark time"). In the case of the Ramsey resonance with dark time, the signal takes a binary value of 0 (dark time) and 1 (at the time of the Ramsey pulse irradiation), and therefore, the modulation is amplitude shift keying (hereinafter referred to as "ASK"). In the ASK, the power inputted to the AOM crystal changes in contrast to the FSK. Therefore, it should be noted that the chirp occurs in frequency since the crystal changes in temperature and therefore the expansion/refractive index changes.

Figure 5:
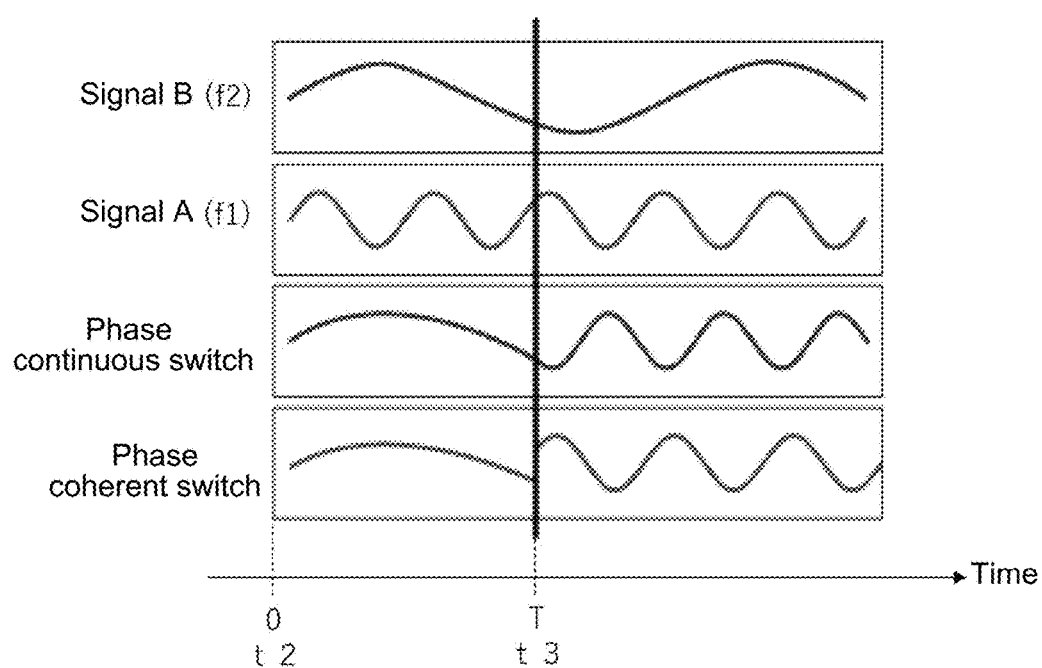
FIG. 5 is a diagram showing a temporal change of an RF-signal. Starting from the upper stage, it shows the signal B of the frequency f2, the signal A of the frequency f1, the signal switched from the signal B to the signal A at t=T using a phase continuous switch, and the signal switched from the signal B to the signal A at t=T using a phase coherent switch.

FIG. 5 shows the temporal change of the RF signal that modulates the laser light of a Ramsey resonance. Starting from the upper stage, it shows the signal B of the frequency f2, the signal A of the frequency f1, the signal which is switched from the signal B to the signal A at t=T using the phase continuous switch, and the signal which is switched from the signal B to the signal A at t=T using a phase coherent switch. As described above, the switch of the second Ramsey pulse is turned on at t=T(t3). This switch is a phase coherent switch as previously described. Therefore, if the condition of the phase continuity is not required, the phase shift occurs between the signal B and the signal A at t=T(t3) (see the bottom row in FIG. 5). If the phase of the signal B and that of the signal A are discontinuous, high-frequency components are generated, resulting in unstable control of the optical path length stabilization circuit. Therefore, the Doppler effect cannot be sufficiently suppressed. Therefore, at t=T(t3), it is required for the signal B and the signal A to satisfy the phase continuity condition (see the third stage from the top of FIG. 5).

Figure 6:
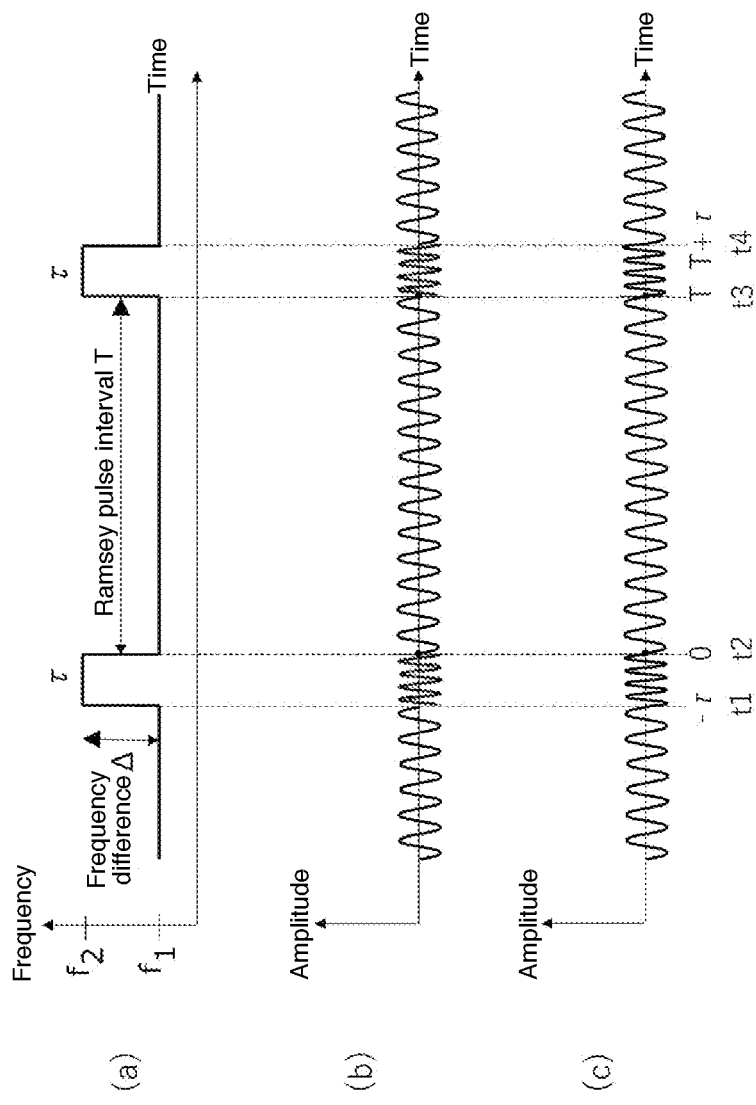
FIG. 6 is a diagram showing a temporal change of the RF-signal. (a) is a graph showing the temporal change of the oscillation frequency of the laser light of a Ramsey resonance according to the first embodiment. (b) is a graph showing when the Ramsey pulse and the non-resonant wave do not satisfy the condition of the phase continuity. (c) is a graph showing when the Ramsey pulse and the non-resonant wave satisfy the condition of the phase continuity.

FIG. 6 shows the temporal change of the RF signal when the Ramsey resonance shown in FIG. 2 is given. (a) in FIG. 6 is the same as in FIG. 2. (b) in FIG. 6 shows the case in which the electromagnetic wave (Ramsey pulse) of the first frequency f1 and the electromagnetic wave (non-resonant wave) of the second frequency f2 do not satisfy the condition of phase continuity. (c) in FIG. 6 shows the case in which the electromagnetic wave of the first frequency f1 and the electromagnetic wave of the second frequency f2 satisfy the condition of phase continuity. If the condition of phase continuity is not satisfied as shown in (b) in FIG. 6, a phase jump occurs between the Ramsey pulse and the non-resonant wave. As shown (c) in FIG. 6, no phase jump occurs between the Ramsey pulse and the non-resonant wave when the phase continuity condition is satisfied. This is preferred to suppress the Doppler effect.

During the period after the switch of the first Ramsey pulse is turned off at time t=0 (t2) until the switch of the second Ramsey pulse is turned on at time t=T (t3), the phase of the signal A is advanced by $2\pi \cdot f1 \cdot T$, and the phase of the signal B is advanced by $2\pi \cdot f2 \cdot T$. Therefore, in order for both the phases to coincide at time t=T(t3), it is required and sufficient to satisfy the following equation (n is a natural number).

$$|2\pi \cdot f1 \cdot T - 2\pi \cdot f2 \cdot T| = n \cdot 2\pi$$

That is $$|f1-f2|=(\Delta=)n/T$$

The embodiment satisfies this relation. With this, the embodiment achieves the phase coherent FSK while simultaneously satisfying the phase continuity condition when the switch of the Ramsey pulse is turned on. As a result, Ramsey spectroscopy can be realized while suppressing the Doppler effect more effectively.

The value of n described above may be any value as long as it is a natural number, and is not particularly limited by the upper limit and/or the lower limit. In practical use, it is preferred such that after defining the resonance frequency (f1) and the Ramsey pulse interval (T), the approximate value of n corresponding to the detuning ($\Delta=|f1-f2|$) is determined, and then f2 is selected in accordance with the above-described equation, etc. For example, after determining the resonance frequency f1=80 MHz and T=1 s, $\Delta$ is set to about 1 MHz. The n corresponding to this is determined as, $$N=T \cdot |f1-f2|=T \cdot \Delta = 1s \cdot 1 \text{ MHz} = 10^6.$$

Therefore, f2 is determined to be 79 MHz.

Here, the natural number n, the first frequency f1, the second frequency f2, the oscillation interval T of the Ramsey pulse are not necessarily required to strictly satisfy the following equation.

$$|f1-f2|=n/T \qquad (1)$$

For example, when the times T1 and T2 are defined for any natural number n as a time that satisfies the following equations, $$|f1-f2|=n/T1 \qquad (2)$$

$$|f1-f2|=(n+1)/T2 \qquad (3)$$

The oscillation interval T may satisfy the following formula.

$$T1-0.25 \cdot (T2-T1) \leq T \leq T1+0.25 \cdot (T2-T1) \qquad (4)$$

The oscillation interval T at this time deviates from T satisfying the Equation (1) by ±25% at most. Even if the oscillation interval T is deviated to this degree, the phase between the Ramsey pulse and the non-resonant wave is smooth enough for practical use, the control of the optical path length stabilization circuit operates normally, and the Doppler effect can be sufficiently suppressed, resulting in satisfactory spectral accuracy.

According to this embodiment, it is possible to have a range of about ±25% from the optimum value with respect to the oscillation interval of the Ramsey pulse. Therefore, the degree of freedom in design is improved.

The laser light modulator 40 is not limited to an AOM and may be any arbitrary optical modulator. The detector 60 is not limited to an optical heterodyne detector, but may be any arbitrary detector. The laser light source 100 is not limited to a laser light source and may be an arbitrary suitable laser light source.

Comparative Example

Comparative Example according to the first embodiment is described. As Comparative Example, Non-Patent Document 1 describes a Ramsey spectrometer for an optical lattice clock. The component structure of this Comparative Example is similar to that of this embodiment, but differs from this embodiment in that no control of $|f1-f2|=n/T$ (phase continuity condition) is used. Therefore, it is understood that this embodiment has a remarkable effect of realizing Ramsey spectroscopy while effectively suppressing the Doppler effect with respect to Comparative Example.

First Embodiment (Resumed)

Figure 7:
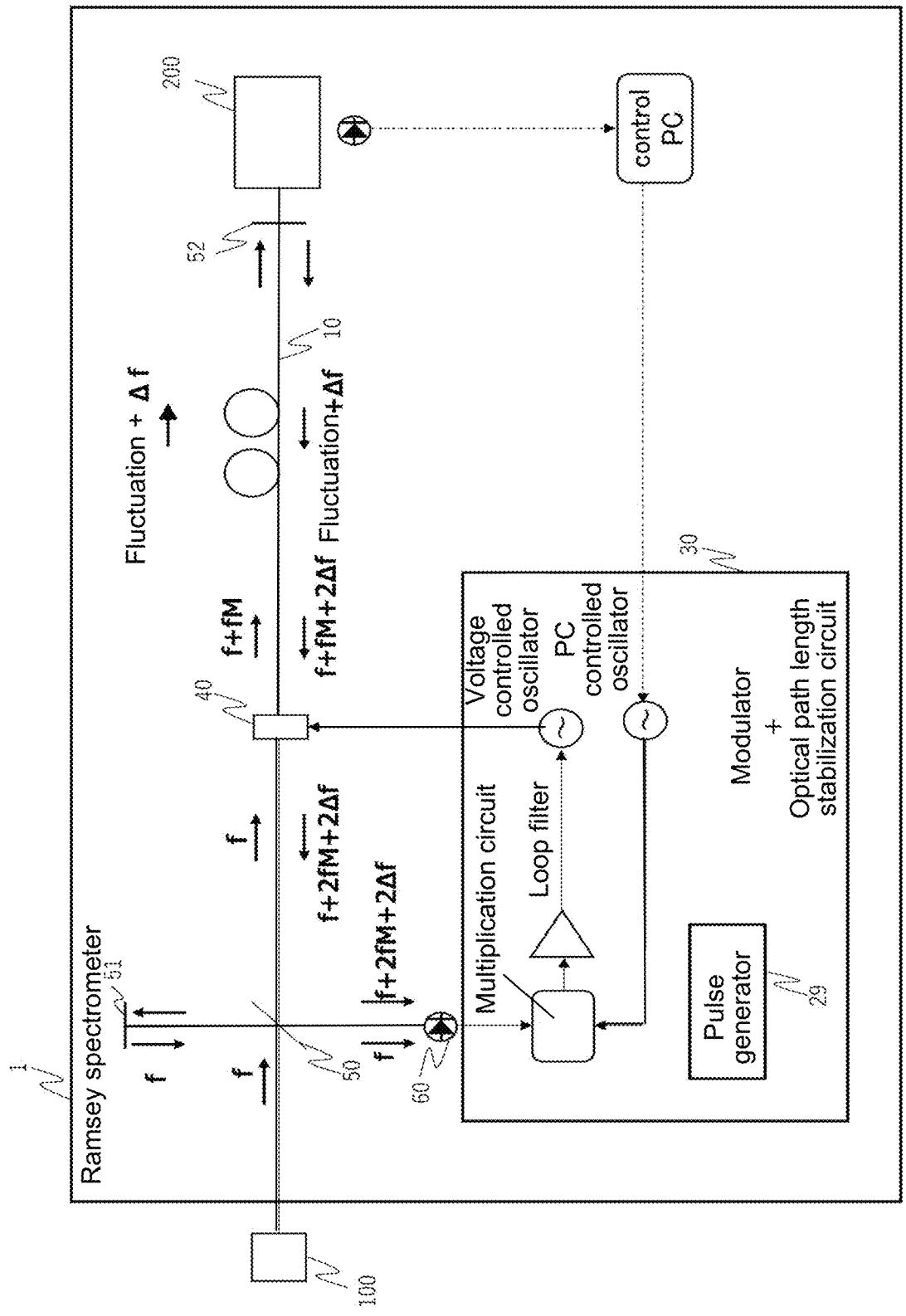
FIG. 7 is a detailed functional block diagram of the Ramsey spectrometer according to the first embodiment.

Returning to the explanation of the first embodiment, FIG. 7 is a detailed functional block diagram of the Ramsey spectrometer 1 of FIG. 1. The modulator and the optical path stabilization circuit are hardware-integrated. The optical path length stabilization circuit 30 includes a pulse generator 29. The optical path length stabilization circuit 30 includes a PC controlled oscillator, a voltage-controlled oscillator, a multiplication circuit (phase comparator), and a PLL (Phase Locked Loop) including a loop filter.

The laser light of a frequency f oscillated from the laser light source 100 is branched into two at the beam splitter 50. One of the branched laser light advances to the reference mirror 51, and the other advances to the AOM 40. For the latter laser light, the AOM 40 gives an intended frequency shift fM. An unintentional frequency shift $\Delta f$ (Doppler effect due to the change in the length of the optical path, usually about 1 kHz) is given to the laser light that has become a frequency f+fM given a frequency shift fM by the AOM 40 while passing through the optical path 10. Therefore, the frequency of the laser light becomes f+fM+Δf. This laser light is reflected by the lattice end mirror 52 and then returns to the AOM through the same optical path as previously described. In optical path, since the unintentional frequency shift as described above is given, the frequency becomes f+Fm+2·Δf. For this laser light, the AOM 40 again gives an intended frequency shift fM. As a result, the frequency of the laser light becomes f+2·(fM+Δf). This laser light and the laser light of the frequency f reflected by the reference mirror 51 are inputted to the optical heterodyne detector 60 via the beam splitter 50. The optical heterodyne detector 60 detects these two laser light to detect the difference frequency 2·(fM+Δf).

The signal of this difference frequency 2·(fM+Δf) is inputted to one of the input terminals of the multiplication circuit. On the other hand, the PC controlled oscillator outputs a signal of the frequency 2·fM and inputs it to the other of the input terminals of the multiplication circuit. The output from the multiplication circuit becomes a signal of 2·Δf, but the RF signal of the AOM 40 is controlled so that this becomes zero. As a result, the fluctuation Δf due to the Doppler effect can be suppressed. Switching the fM to an RF signal (80 MHz when On, 79 MHz when Off) corresponding to the Ramsey pulse can provide a Ramsey pulse in which the fluctuation Δf has been suppressed by the Doppler effect.

According to this embodiment, by using the PC controlled oscillator, the voltage-controlled oscillator, and the multiplication circuit (phase comparator), a PLL (Phase Locked Loop) including the loop filter, it is possible to effectively suppress the Doppler effect.

Second Embodiment

Figure 8:
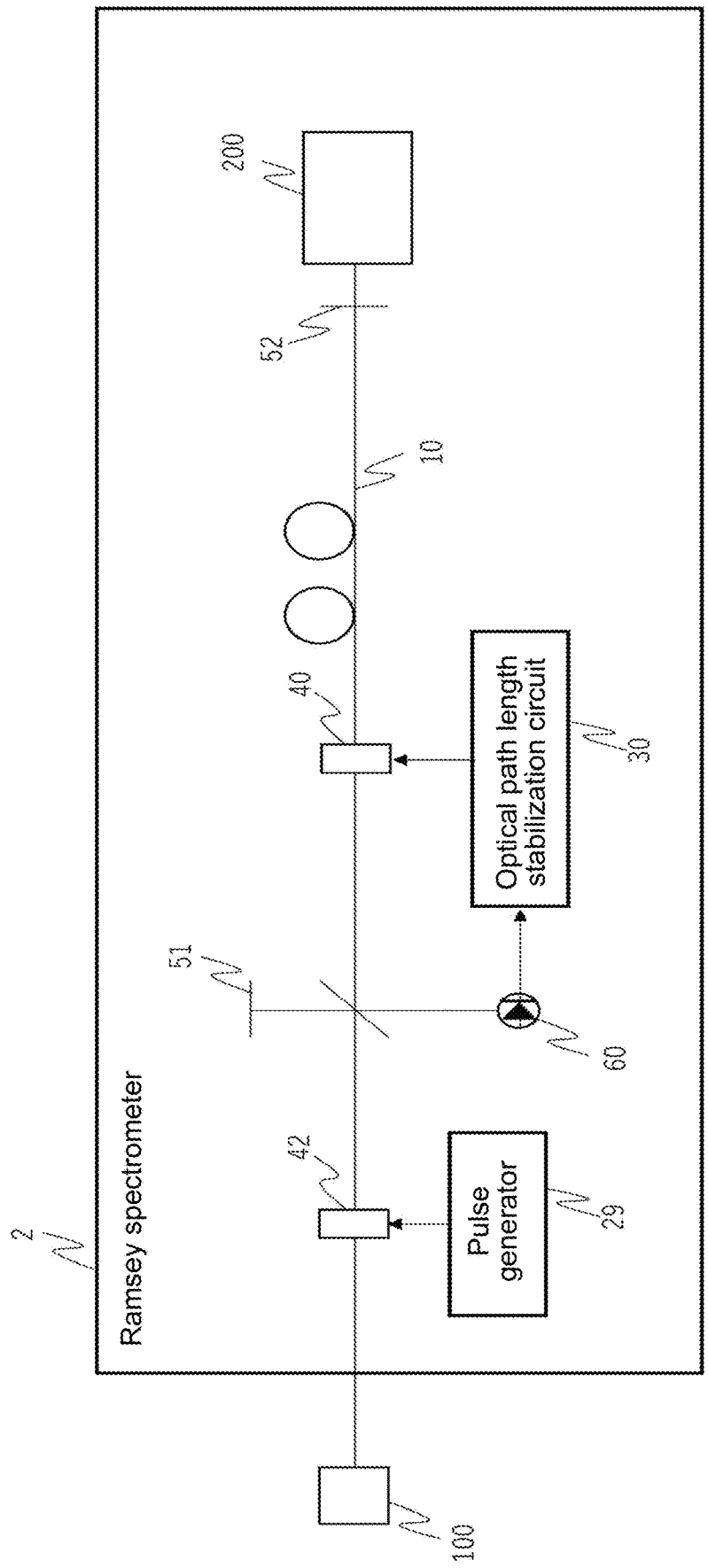
FIG. 8 is a functional block diagram of a Ramsey spectrometer according to a second embodiment.

FIG. 8 is a functional block diagram of a Ramsey spectrometer 2 according to a second embodiment. The Ramsey spectrometer 2 is provided with an optical path 10, a pulse generator 29, an optical path length stabilization circuit 30, and a laser light modulator 40. The Ramsey spectrometer 2 differs from the Ramsey spectrometer 1 of FIG. 1 in that the modulator for generating a Ramsey pulse and the optical path length stabilization circuit are configured independently of each other. The other configurations are the same as those of the Ramsey spectrometer 1.

Figure 9:
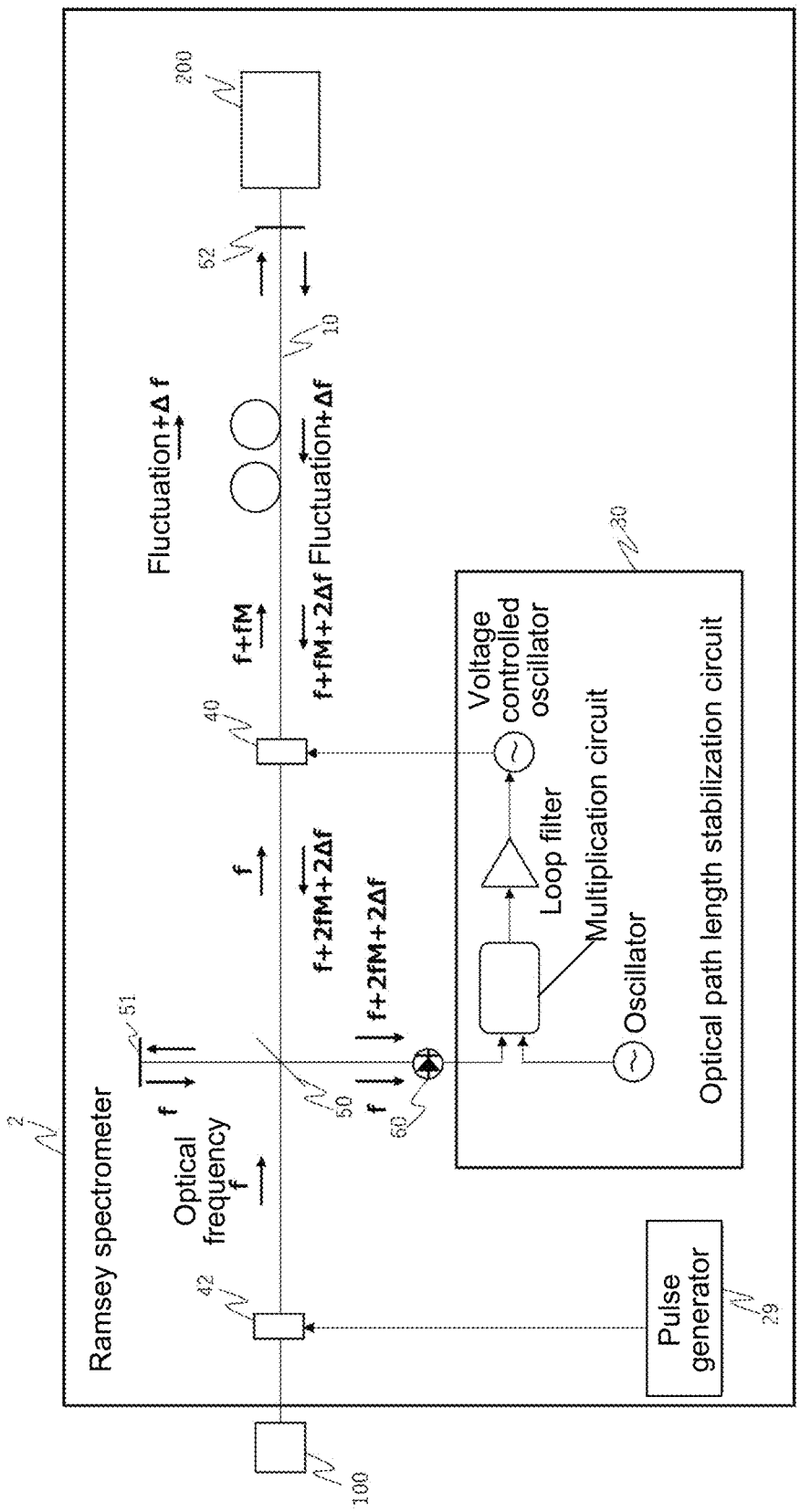
FIG. 9 is a detailed functional block diagram of the Ramsey spectrometer according to the second embodiment.

FIG. 9 is a detailed functional block diagram of the Ramsey spectrometer 2 according to the second embodiment. The optical path length stabilization circuit 30 is provided with a PLL (Phase Locked Loop) including a voltage-controlled oscillator, an oscillator, a multiplication circuit (phase comparator), and a loop filter.

The laser light oscillated from the laser light source 100 generates a Ramsey pulse when the frequency is switched by the AOM 42. For example, the frequency is set to 80 MHz at the time of ON and 79 MHz at the time of OFF. After entering the AOM 42, the laser light of the frequency f is branched into two at the beam splitter 50. The operation of the Ramsey spectrometer 2 thereafter is the same as that of the Ramsey spectrometer 1 shown in FIG. 7.

The signal of this difference frequency 2·(fM+Δf) is inputted to one of the input terminals of the multiplication circuit. On the other hand, the signal of the reference frequency 160 MHz (=2·fM) transmitted from the oscillator is inputted to the other of the input terminals of the multiplication circuit. The Multiplication circuit detects the phase difference between the difference frequency 2·(fM+Δf) and the reference frequency. The loop filter controls the difference frequency 2·(fM+Δf) so that the phase difference from the reference frequency becomes 0, and inputs it to the voltage-controlled oscillator. The voltage-controlled oscillator oscillates the signal of fM−Δf (=80 MHz−Δf). As a result, it is possible to provide a Ramsey pulse in which the contribution Δf by the Doppler effect has been suppressed.

Like the first embodiment, this embodiment can effectively suppress the Doppler effect and realize a Ramsey spectroscopy.

Third Embodiment

A third embodiment is an optical lattice clock. This optical lattice clock is characterized in that it is provided with a Ramsey spectrometer of the above-described embodiment. Existing techniques may be used for the basic configuration of the optical lattice clock. For example, the optical lattice clock described in Non-Patent Document 5 is provided with an optical waveguide, an optical path, a laser light source, a laser-cooling portion, and an optical grating. The optical lattice clock of this embodiment can be constructed by adding the Ramsey spectrometer described above to the optical lattice clock described in Non-Patent Document 5.

According to this embodiment, it is possible to provide an optical lattice clock that realizes Ramsey spectroscopy while suppressing the Doppler effect effectively.

Fourth Embodiment

A fourth embodiment is a spectroscopic method. This spectroscopic method is characterized in that the Ramsey spectrometer of the above-described embodiment is used. That is, the Ramsey spectrometer is provided with an optical path, an optical path length stabilization circuit, a modulator optically connected to the optical path, and a spectroscopic unit. The method includes a step of stabilizing the length of the optical path by using the optical path length stabilization circuit, a step of generating a resonant laser light of a first frequency f1 that generates an atomic resonance a plurality of times in pulses using the modulator and generating a non-resonant laser light of a second frequency f2 that does not generate a resonance, and a step of spectroscopying the light of the spectroscopic target using the spectroscopic unit.

According to this embodiment, Ramsey spectroscopy can be realized while effectively suppressing the Doppler effect.

In a certain embodiment, when n is an arbitrary natural number and the oscillation interval of the resonant laser light is T, time T1 and time T2 are defined as times that satisfy |f1−f2|=n/T1, and |f1−f2|=(n+1)/T2, the modulator may be controlled such that the oscillation interval T satisfies $$T1-0.25\cdot(T2-T1) \le T \le T1+0.25\cdot(T2-T1).$$

According to this embodiment, the oscillation interval of the Ramsey pulse can be varied from the optimum by ±25%. Therefore, the degree of freedom in design is improved.

In a certain embodiment, when n is an arbitrary natural number and the oscillation interval of the resonant laser light is T, the modulator may be controlled such that the difference |f1−f2| between the first frequency f1 and the second frequency f2 satisfy |f1−f2|=n/T.

According to this embodiment, Ramsey spectroscopy can be realized while suppressing the Doppler effect more effectively.

The present invention has been described above based on some embodiments. It will be understood by those skilled in the art that these embodiments are illustrative, and that various modifications can be made to the respective components thereof and the combination of the respective processing processes, and that such modifications are also within the scope of the present invention For example, in the above-described embodiments, an atom is shown as a spectroscopic target, but the present invention is not limited thereto, and molecules or ions may be spectroscopic targets

What is claimed is:

1. A Ramsey spectrometer comprising:
an optical path;
an optical path length stabilization circuit configured to stabilize a length of the optical path;
a modulator optically connected to the optical path, the modulator being configured to generate resonant laser light of a first frequency f1 that causes a resonance of an atom, a molecule, or an ion as a spectroscopic target in pulses a plurality of times and to generate non-resonant laser light of a second frequency f2 that does not cause the resonance at times between the pulses of the resonant laser light to separate the pulses of the resonant laser light; and
a spectroscopic unit configured to spectroscope the spectroscopic target,
wherein the spectroscopic unit is configured to detect a state change of the spectroscopic target corresponding to the first frequency f1, the state change being caused by irradiating the spectroscopic target with the resonant laser light.

2. The Ramsey spectrometer as recited in claim 1, wherein when n is an arbitrary natural number, an oscillation interval of the resonant laser light is T, and a time T1 and a time T2 are defined as times that satisfy |f1−f2|=n/T1, and |f1−f2|=(n+1)/T2, respectively, the oscillation interval T is set to satisfy $$T1-0.25\cdot(T2-T1)\leq T\leq T1+0.25\cdot(T2-T1).$$

3. The Ramsey spectrometer as recited in claim 1, wherein the modulator generates the resonant laser light and the non-resonant laser light in such a manner that their phases are temporally continuous.

4. The Ramsey spectrometer as recited in claim 1, wherein the modulator includes a switching element that generates the resonant laser light and the non-resonant laser light by switching therebetween.

5. The Ramsey spectrometer as recited in claim 2, wherein a difference |f1−f2| between the first frequency f1 and the second frequency f2 is set to satisfy |f1−f2|=n/T.

6. The Ramsey spectrometer as recited in claim 1, wherein the optical path includes an optical fiber.

7. The Ramsey spectrometer as recited in claim 1, wherein the optical path includes a free space.

8. The Ramsey spectrometer as recited in claim 1, wherein the modulator and the optical path length stabilization circuit are integral.

9. The Ramsey spectrometer as recited in claim 8, wherein the optical path length stabilization circuit is provided with a PC controlled oscillator, a voltage-controlled oscillator, and a multiplication circuit.

10. The Ramsey spectrometer as recited in claim 1, wherein the modulator and the optical path length stabilization circuit are independent.

11. The Ramsey spectrometer as recited in claim 10, wherein the optical path length stabilization circuit is provided with a PLL circuit.

12. The Ramsey spectrometer as recited in claim 1, further comprising:
a laser light source connected to one end of the optical path.

13. The Ramsey spectrometer as recited in claim 12, further comprising:
a laser light modulator connected to the modulator, the laser light modulator being configured to modulate laser light emitted by the laser light source.

14. The Ramsey spectrometer as recited in claim 13, wherein the laser light modulator is an acousto-optic modulator.

15. An optical lattice clock comprising:
the Ramsey spectrometer as recited in claim 1.

16. A spectroscopic method using a Ramsey spectrometer, wherein the Ramsey spectrometer comprises:
an optical path;
an optical path length stabilization circuit; and
a modulator optically connected to the optical path, and
a spectroscopic unit, and
wherein the spectroscopic method comprises the steps of:
stabilizing a length of the optical path using the optical path length stabilization circuit;
generating resonant laser light of a first frequency f1 that causes a resonance of an atom, a molecule, or an ion as a spectroscopic target in pulses a plurality of times and generating non-resonant laser light of a second frequency f2 that does not cause the resonance at times between the pulses of the resonant laser light to separate the pulses of the resonant laser light; and
spectroscopying the spectroscopic target using the spectroscopic unit.

17. The spectroscopic method as recited in claim 16, wherein when n is an arbitrary natural number, an oscillation interval of the resonant laser light is T, and a time T1 and a time T2 are defined as times that satisfy |f1−f2|=n/T1, and |f1−f2|=(n+1)/T2, respectively, the oscillation interval T is set to satisfy $$T1-0.25\cdot(T2-T1)\leq T\leq T1+0.25\cdot(T2-T1).$$

18. The spectroscopic method as recited in claim 17, wherein a difference |f1−f2| between the first frequency f1 and the second frequency f2 is set to satisfy |f1−f2|=n/T.

* * * * *